(12) United States Patent
Taguchi et al.

(10) Patent No.: US 7,493,187 B2
(45) Date of Patent: Feb. 17, 2009

(54) QUILTING DATA PROCESSING APPARATUS AND COMPUTER PROGRAM PRODUCT

(75) Inventors: Shoichi Taguchi, Nagoya (JP);
Yukiyoshi Muto, Nagoya (JP);
Mikitoshi Suzuki, Nagoya (JP);
Masahiro Mizuno, Nagoya (JP);
Akihiro Wakayama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 304 days.

(21) Appl. No.: 11/475,222

(22) Filed: Jun. 27, 2006

(65) Prior Publication Data
US 2007/0032892 A1 Feb. 8, 2007

(30) Foreign Application Priority Data
Jul. 12, 2005 (JP) .............................. 2005-203390

(51) Int. Cl.
*G06F 19/00* (2006.01)
(52) U.S. Cl. ..................................................... 700/131
(58) Field of Classification Search ................. 700/131, 700/132, 133, 135, 136, 137, 138; 112/80.23, 112/117, 470.01, 475.05, 475.19; 11/80.23, 11/117, 470.01, 475.05, 475.19
See application file for complete search history.

(56) References Cited

U.S. PATENT DOCUMENTS 4,879,169 A * 11/1989 Zafiroglu .................... 442/183
4,953,485 A * 9/1990 Brower et al. ........... 112/475.05
5,799,600 A * 9/1998 Reuben ....................... 112/420
6,859,679 B1 * 2/2005 Smith et al. ................. 700/138
7,063,028 B2 * 6/2006 Codos et al. ................. 112/2.1

FOREIGN PATENT DOCUMENTS

JP A-11-226278 8/1999

* cited by examiner

Primary Examiner—Albert DeCady
Assistant Examiner—Chad Rapp
(74) Attorney, Agent, or Firm—Oliff & Berridge, PLC

(57) ABSTRACT

The disclosure presents a quilting data processing apparatus and a program capable of displaying changes of fabric caused by a sewing line, and or easily displaying a visual image of a finished state of quilting. The CPU receives the fabric pattern of quilting, the thickness of fabric, the thickness of elastic material, and the sewing line of quilting, and, when the preview button is pressed, creates a basic mesh pattern, calculates the total deformation degree, deforms the basic mesh pattern sequentially along the sewing line to a deformation degree commensurate with the total deformation degree, and deforms each mesh adjacent to deformed meshes commensurately with the deformation degree, thereby creating a deformation mesh pattern (S1 to S5). Consequently, the CPU adheres to each mesh the fabric pattern displayed in a specified size in accordance with the deformation mesh pattern so as to create deformation fabric image data, overlaps the sewing line data to the upper side of the deformation fabric image data, and displays as a quilting pattern (S6 to S7).

14 Claims, 13 Drawing Sheets

FIG. 1
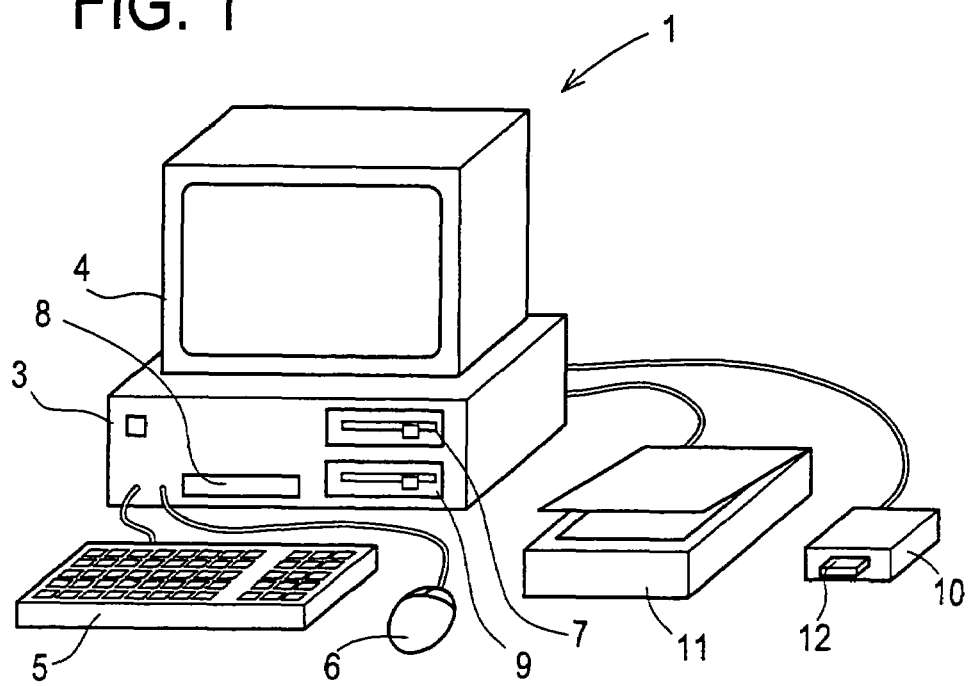
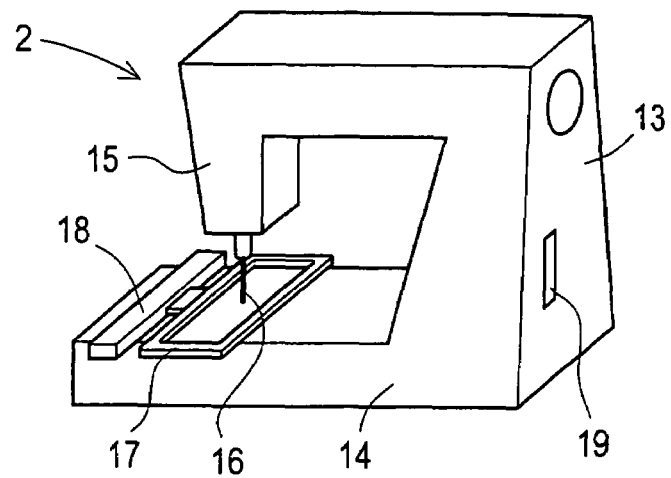

QUILTING DATA PROCESSING APPARATUS AND COMPUTER PROGRAM PRODUCT

CROSS-REFERENCE TO RELATED APPLICATIONS

This application claims priority from JP 2005-203390, filed Jul. 12, 2005, the contents of which are hereby incorporated by reference.

TECHNICAL FIELD

The disclosure relates to a quilting data processing apparatus and computer program product, and more particularly to a quilting data processing apparatus and computer program product for creating display data of quilting patterns.

BACKGROUND

Hitherto, various ideas have been proposed for quilting data processing apparatuses and computer program products for creating display data of quilting patterns.

For example, in a proposed quilting data processing apparatus comprising an input means for entering sewing line data of quilting patterns, a data storage means for storing the entered sewing line data, and a display means including a display unit, a display data creating means is also incorporated for creating display data for setting, on the basis of sewing line data stored in the data storage means at least one of a band-shaped bright region and a dark region showing bright and dark bands formed at both sides of a sewing line by means of illumination from a specified direction on the quilting pattern, and showing at least one of the quilting patterns and a bright region and a dark region, on the display unit (see, for example, Japanese patent application laid-open No. H11 (1999)-226278, paragraphs [0020] to [0041], and FIGS. 1 to 10).

Such a conventional quilting data processing apparatus, however, expresses only bright and dark portions formed on the surface by means of changes in the thickness of fabric caused by the sewing line; deformation of the fabric itself cannot be displayed, and it is hard to obtain images of a finished state of quilting.

SUMMARY

The disclosure is devised to solve the above problems, and it is hence an object thereof to present a quilting data processing apparatus and a computer program product capable of showing changes of the fabric caused by the sewing line, and of easily creating images of a finished state of quilting.

To achieve the above object, there is provided a quilting data processing apparatus comprising: a fabric image data input device that enters fabric image data relating to a fabric pattern used in quilting; a sewing line data input device that enters sewing line data of a quilting pattern; a mesh pattern setting device that sets a basic mesh pattern of a desired mesh shape; a deformation mesh pattern creating device that creates a deformation mesh pattern by deforming the basic mesh pattern on the basis of the sewing line data; a deformation fabric image data creating device that creates deformation fabric image data modifying the fabric image data on the basis of the deformation mesh pattern; and a quilting pattern display device that displays the quilting pattern on the basis of the deformation fabric image data and the sewing line data.

In this quilting data processing apparatus, by means of input of fabric image data about fabric patterns used in quilting, and sewing line data of quilting patterns, a deformation mesh pattern representing deformation of a basic mesh pattern of a desired mesh shape is created on the basis of the sewing line data. As a result, deformation fabric image data is created by correcting the fabric image data entered on the basis of the deformation mesh pattern. Then, on the basis of the deformation fabric image data and sewing line data entered, a quilting pattern is created and displayed.

Accordingly, the state of a fabric pattern used in quilting that has been changed by a sewing line can be shown, and it becomes possible for changes in the fabric itself to be displayed. Thus the finished state of quilting pattern can be visually recognized easily even by an inexperienced operator.

To achieve the above object, there is also provided a computer program product used and executed by a quilting data processing apparatus comprising: a computer readable recording medium; and a computer program stored in the computer readable recording medium, wherein the computer program includes: a fabric image data input step of entering fabric image data relating to a fabric pattern used in quilting; a sewing line data input step of entering sewing line data of a quilting pattern; a mesh pattern setting step of setting a basic mesh pattern of a desired mesh shape; a deformation mesh pattern creating step of creating a deformation mesh pattern by deforming the basic mesh pattern on the basis of the sewing line data; a deformation fabric image data creating step of creating deformation fabric image data by modifying the fabric image data on the basis of the deformation mesh pattern; and a quilting pattern display step of displaying the quilting pattern on the basis of the deformation fabric image data and the sewing line data.

In this computer program product, the computer reads the program stored in the recording medium, and creates a deformation mesh pattern on which the basic mesh pattern of a desired mesh shape has been deformed from the sewing line data of a quilting pattern entered by the user. On the basis of this deformation mesh pattern, the computer further creates deformation fabric image data by correcting the fabric image data about the fabric pattern used in quilting entered by the user. The computer thereafter creates and displays a quilting pattern on the basis of the deformation fabric image data and sewing line data.

Accordingly, when the user enters the fabric image data about the fabric pattern and the sewing line data, the computer displays the state of the fabric pattern used in quilting as it has been changed by the sewing line, and displays changes in the fabric itself. Hence, even an inexperienced operator can easily recognize visually the finished state of the quilting pattern.

BRIEF DESCRIPTION OF THE DRAWINGS

FIG. 1 is a perspective view of an outline of the quilting data processing apparatus in an exemplary embodiment;

FIG. 9A is a diagram of an example of a basic mesh pattern dividing the quilting display region into mesh cells;

FIG. 9B is a diagram of an example of a deformation mesh pattern that is the basic mesh pattern of FIG. 9A deformed on the basis of sewing line data in FIG. 8;

DETAILED DESCRIPTION

Figure 2:
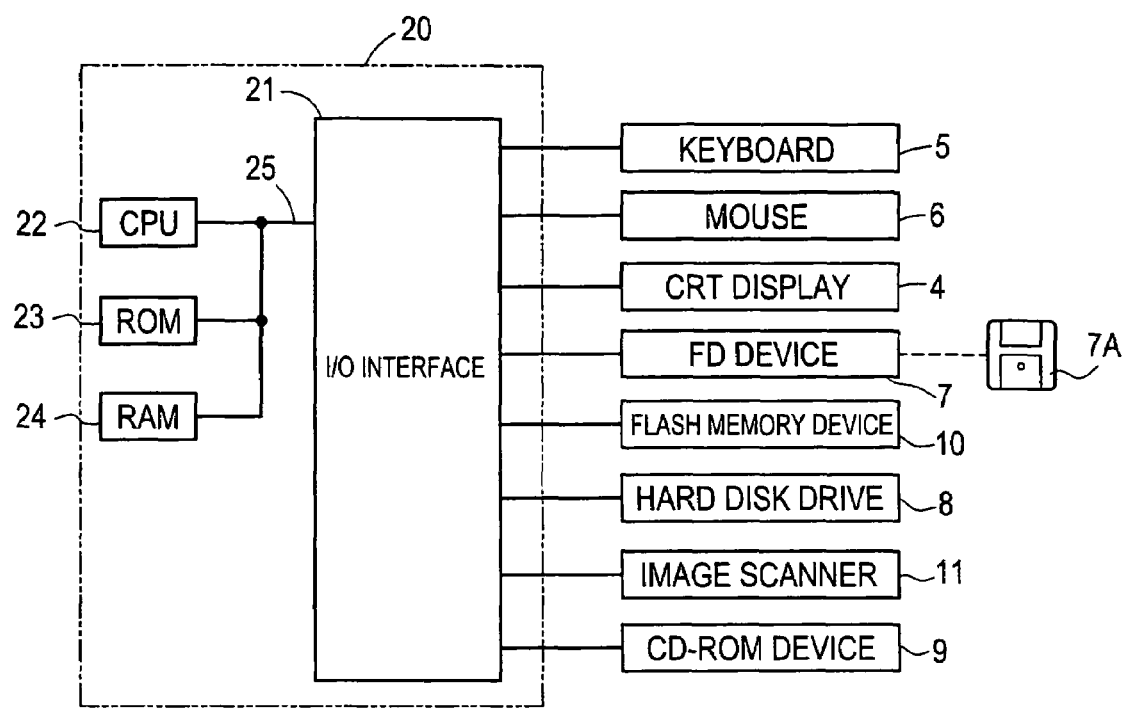
FIG. 2 is a block diagram of the control system of the quilting data processing apparatus.

A detailed description of a quilting data processing apparatus and a computer program product of the disclosure will now be given referring to the accompanying drawings.

First, an outline of the quilting data processing apparatus in an exemplary embodiment is explained with reference to FIG. 1.

In FIG. 1, a quilting data processing apparatus 1 is essentially made up to a control main body 3. The control main body 3 includes a CRT display 4 for displaying images, patterns, texts, and the like. The control main body 3 also includes a keyboard 5, a mouse 6, a flexible disk (FD) device 7, a hard disk drive 8, a CD-ROM device 9, a flash memory device 10, and an image scanner 11.

In the flexible disk device 7, as a recording medium for storing a quilting data processing program, and other programs described below, a flexible disk 7A (see FIG. 2) is detachably loaded. The hard disk drive 8 is a device for storing into the hard disk image data, outline data, embroidery data, sewing line data, and quilting pattern data, and for reading out from the hard disk. The CD-ROM device 9 is for reading out the image data, the outline data, the embroidery data, the sewing line data, and the quilting pattern data recorded in the CD-ROM. The flash memory device 10 includes a detachable memory card 12 made up of a nonvolatile flash memory, and writes embroidery data and sewing line data into the memory card 12. The image scanner 11 is for reading in the original images of items such as embroidery patterns, and fabric patterns.

Such programs are recorded in a computer readable recording medium such as a semiconductor memory, a hard disk, a Floppy (registered trademark) disk, a data card (IC card, magnetic card, etc.), an optical disk (CD-ROM, DVD, etc.), a magneto-optical disk (MD, etc.), a phase change disk, or a magnetic tape, and can be used, as required, by loading in a computer and booting up. Alternatively, such programs may be recorded in a ROM or a backup RAM, and may be used by loading the ROM or backup RAM in a computer.

A main body 13 of an embroidery machine 2 is composed by integrally forming an arm 15 in the upper part of a bed 14. A needle bar (not shown) having a sewing needle 16 is provided at the leading end of the arm 15. An embroidery frame 17 for holding a fabric (not shown) is disposed in the upper part of the bed 14. The embroidery frame 17 is composed so as to be able to be moved by an embroidery frame moving mechanism 18 to an arbitrary position on the basis of the original XY coordinates system of the apparatus. While the fabric is moved freely by the embroidery frame moving mechanism 18, the needle bar and hook mechanism (not shown) are driven, and the fabric is processed by a specific embroidery or quilting pattern sewing operation.

At the right side of the sewing machine main body 13, a card slot 19 for loading the memory card 12 is also provided.

The embroidery frame moving mechanism 18, needle bar and the like are controlled by a control device (not shown) made up of equipment such as a microcomputer. The control device receives embroidery data and sewing data from outside through the memory card 12. On the basis of data instructing the extent of movement (needle drop point) in the XY direction of the fabric stitch by stitch in the embroidery data and sewing data, the control device automatically executes an operation for forming an embroidery pattern or a quilting pattern.

An electrical configuration of quilting data processing apparatus 1 will next be explained with reference to FIG. 2.

In FIG. 2, a control device 20 built in the control main body 3 is composed of, for example, a circuit of a microcomputer, including an input and output (I/O) interface 21, a CPU 22, a ROM 23, and a RAM 24, connected mutually by way of a bus line 25.

In the I/O interface 21, a CRT display 4, a keyboard 5, a mouse 6, a flexible disk (FD) device 7, a flash memory device 10, a hard disk drive 8, an image scanner 11, and a CD-ROM 9 are connected.

Having this configuration, the control device 20 reads through the FD device 7, items such as the fabric pattern data and the quilting data processing program stored in the flexible disk 7A, and in accordance with the program obtained, executes a process of creation of display data.

The ROM 23 stores a control program necessary for operating the quilting data processing apparatus 1, a control program for creating a quilting pattern and other display data described below, various programs for processing quilting data, a fabric deformation degree table 31 (see FIG. 3) for creating display data of quilting patterns, an elastic material deformation degree table 32 (see FIG. 4), and various other data and fabric pattern data. The RAM 24 includes a sewing line data storage area for storing sewing line data entered through keyboard 5 or mouse 6, a deformation mesh pattern storage area for storing deformation mesh patterns of basic mesh pattern deformed on the basis of sewing line data, an image data storage area for storing display image data, and other various data memory regions necessary for creating display data of quilting patterns.

The fabric deformation degree table 31 stored in the ROM 23 will next be explained with reference to FIG. 3.

The fabric deformation degree table 31 is a table used for determining the deformation degree of a basic mesh pattern, as described below, and since recesses in sewing lines caused by sewing machines become increasingly deep commensurately with increases in the thickness of the fabric, the deformation degree of a mesh pattern is set to increase commensurately with increases in the thickness of the fabric.

Figure 3:
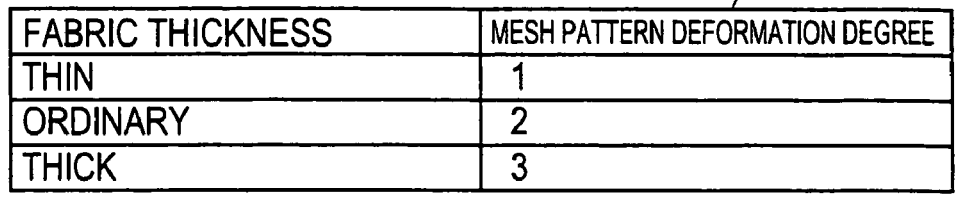
FIG. 3 is a diagram showing an example of a fabric deformation degree table stored in a ROM.

As shown in FIG. 3, the fabric deformation degree table 31 is made up of "thickness of fabric" showing the thickness of a quilting fabric selected by the keyboard 5 or mouse 6, and "deformation degree of mesh pattern" showing the deformation degree of the corresponding basic mesh pattern.

In the "thickness of fabric", three types, "thin," "ordinary" and "thick" are initially stored. In the deformation degree of mesh pattern, "1" is stored initially corresponding to "thin," "2" to "ordinary," and "3" to "thick" preliminarily.

The elastic material deformation degree table 32 stored in the ROM 23 will next be explained with reference to FIG. 4.

The elastic material deformation degree table 32 is a table used for determining the deformation degree of a basic mesh pattern, as described below, and since the thickness of quilting at a time of finishing increases commensurately with increases in the thickness of an elastic material, such as cotton or sponge, interposed between the upper fabric and the under fabric, and also commensurately with increases in the depth of recesses of sewing lines caused by sewing machines, the "deformation degree of mesh pattern" is set to increase commensurately with increases in the thickness of the elastic material.

Figure 4:
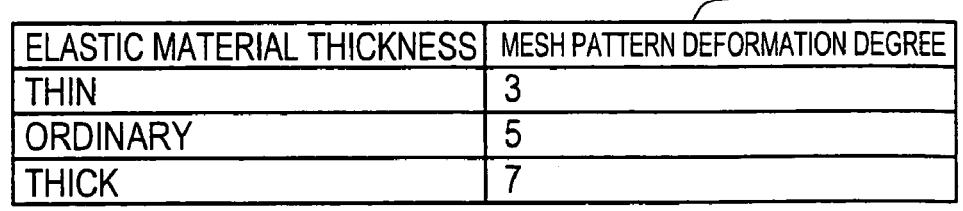
FIG. 4 is a diagram showing an example of an elastic material deformation degree table stored in the ROM.

As shown in FIG. 4, the elastic material deformation degree table 32 is made up of "thickness of elastic material" showing the thickness of the elastic material of quilting selected by the keyboard 5 or mouse 6, and "deformation degree of mesh pattern" showing the deformation degree of the corresponding basic mesh pattern.

In the "thickness of elastic material", three types "thin" (for example, 1 mm to 5 mm), "ordinary" (for example, 6 mm to 10 mm) and "thick" (for example, 11 mm or more) initially are stored. In the" deformation degree of mesh pattern", "3" is stored initially corresponding to "thin," "5" corresponding to "ordinary," and "7" corresponding to "thick".

In the quilting data processing apparatus 1 having such a configuration, a display control process for displaying quilting patterns will next be explained with reference to FIG. 5 to FIG. 16.

Figure 5:
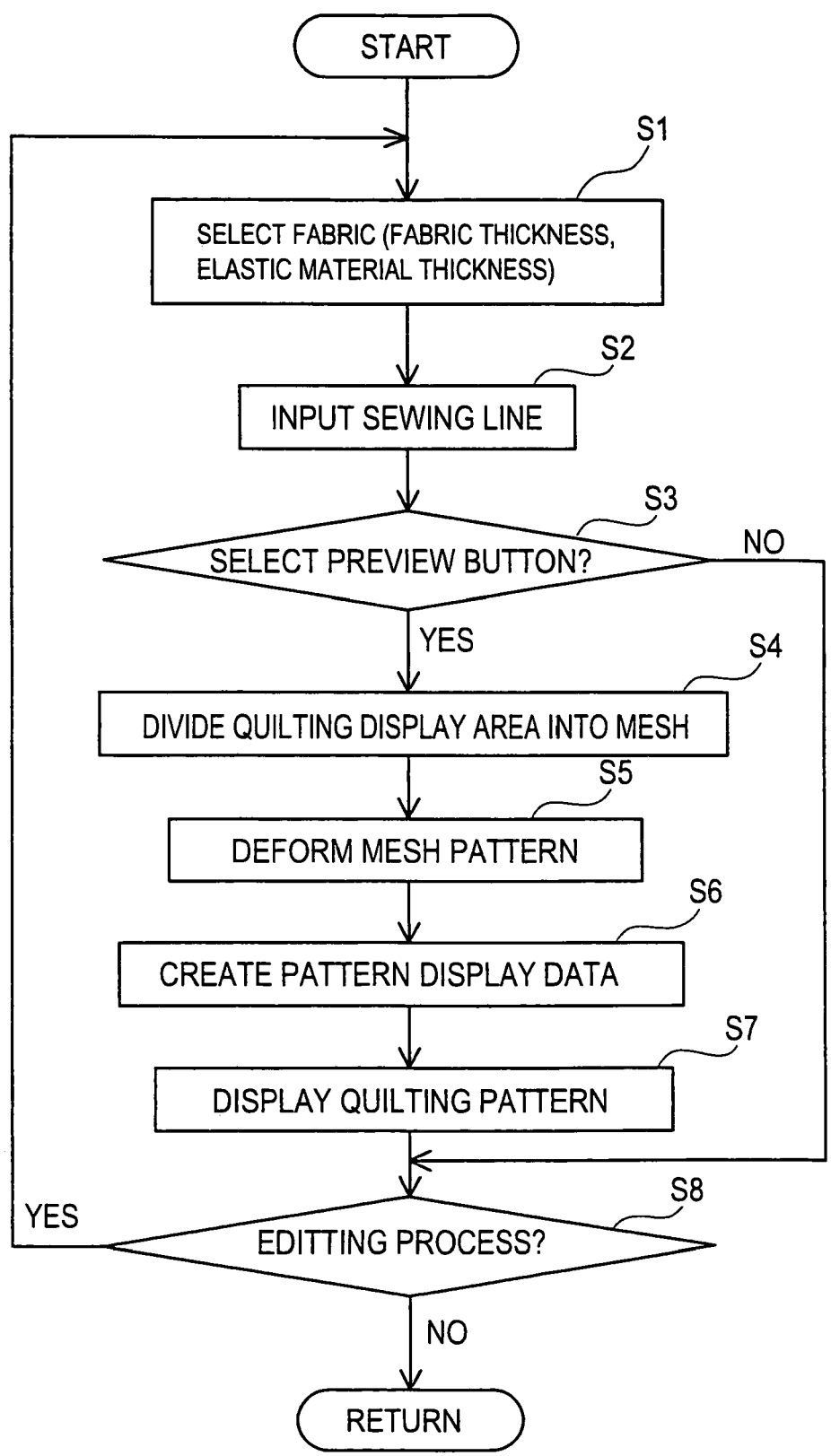
FIG. 5 is a flowchart of a display control program for displaying a quilting pattern.

As shown in FIG. 5, in step 1 (S1), the CPU 22 displays on the CRT display 4 selection screens for selecting a quilting fabric pattern, a fabric thickness, and a thickness of the elastic material interposed between an upper fabric and an under fabric. In circumstances where selection is made by a specific input from the keyboard 5 or mouse 6, the CPU 22 displays in a quilting display area the fabric pattern selected in a specific size, and stores in the RAM 24 the fabric pattern data, the fabric thickness data, and the elastic material thickness data.

Figure 6:
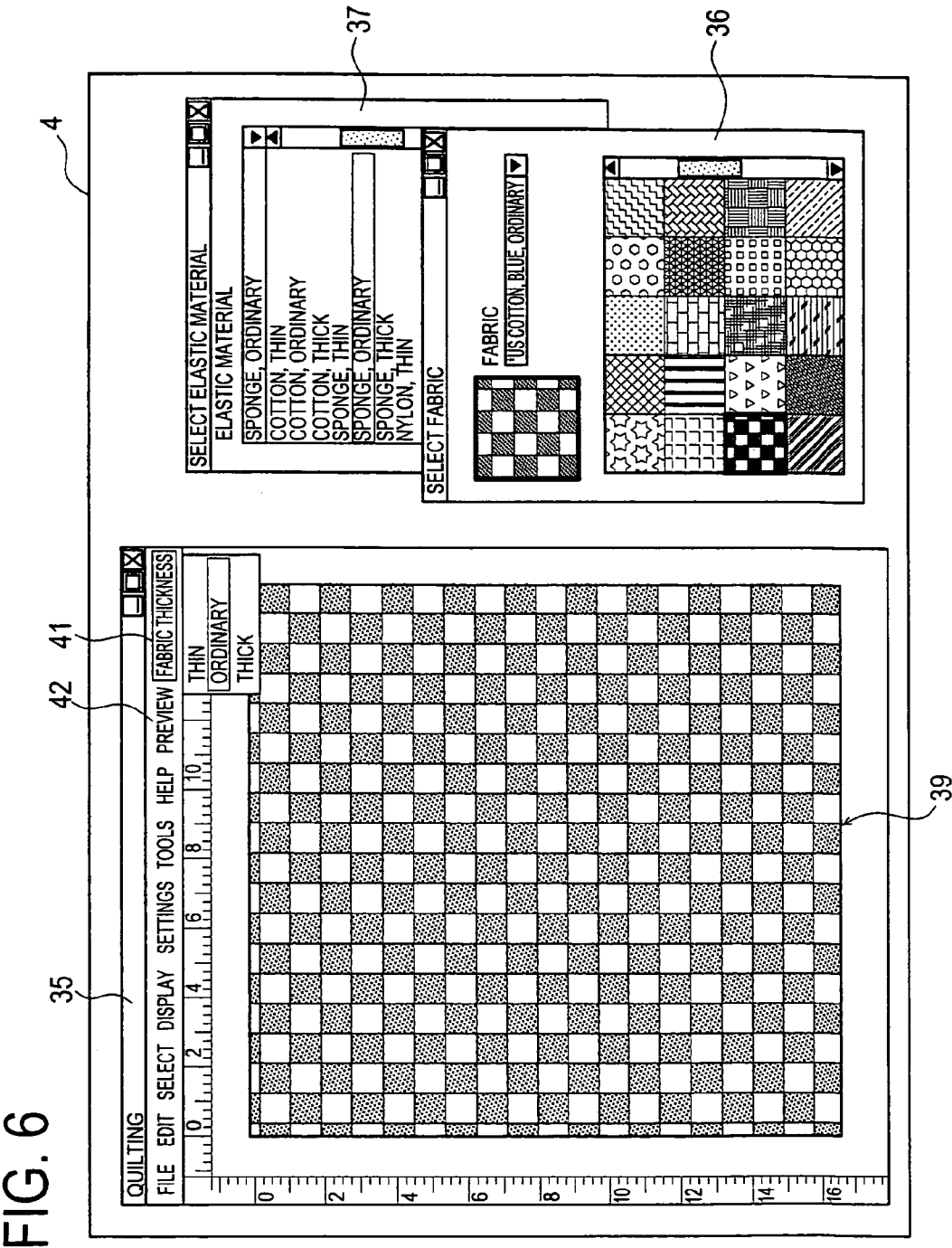
FIG. 6 is a diagram of an example of a fabric selection screen.

For example, as shown in FIG. 6, the CPU 22 shows on the left side of the CRT display 4 a quilting display window 35 for showing a quilting pattern. The CPU 22 also shows on the lower right side of the CRT display 4 a fabric selection window 36 for selecting the fabric pattern. The CPU 22 further shows on the upper right side of the CRT display 4 an elastic material selection window 37 for selecting the type and thickness of the elastic material interposed between the upper fabric and the under fabric.

When a user selects, by means of the keyboard 5 or mouse 6, one fabric pattern from among plural fabric patterns shown on the fabric selection window 36, the CPU 22 shows in the quilting display area 39 of the quilting display window 35 the fabric pattern selected, and stores in the RAM 24 as fabric pattern data. For example, in circumstances where a checkered pattern is selected on the fabric selection window 36, the checkered pattern is shown in the quilting display area 39, and the checkered pattern is stored in the RAM 24 as fabric pattern data.

When a user selects, by the keyboard 5 or mouse 6, the type and thickness of the elastic material shown on the elastic material display window 37, the CPU 22 stores in the RAM 24 the data of the type and thickness of the elastic material. For example, when "sponge, ordinary" is selected, the CPU 22 stores in the RAM 24, as data of the type and thickness of the elastic material, the data "sponge, ordinary".

Furthermore, when a user selects a fabric thickness displayed by clicking, by means of the mouse 6, the fabric thickness button 41 displayed at the upper end of the quilting display window 35, the CPU 22 stores in the RAM 24 the data of the fabric thickness selected. For example, when "ordinary" is selected, the CPU 22 stores the data "ordinary" in the RAM 24 as data of fabric thickness.

In S2, when a user enters the sewing line of quilting by a specific input from the keyboard 5 or mouse 6, the. CPU 22 displays in the quilting display area, this sewing line on the fabric pattern displayed in a specified size, and stores in the RAM 24 the sewing line data. As a result, the user can recognize easily and visually the shape of sewing line of quilting.

Figure 7:
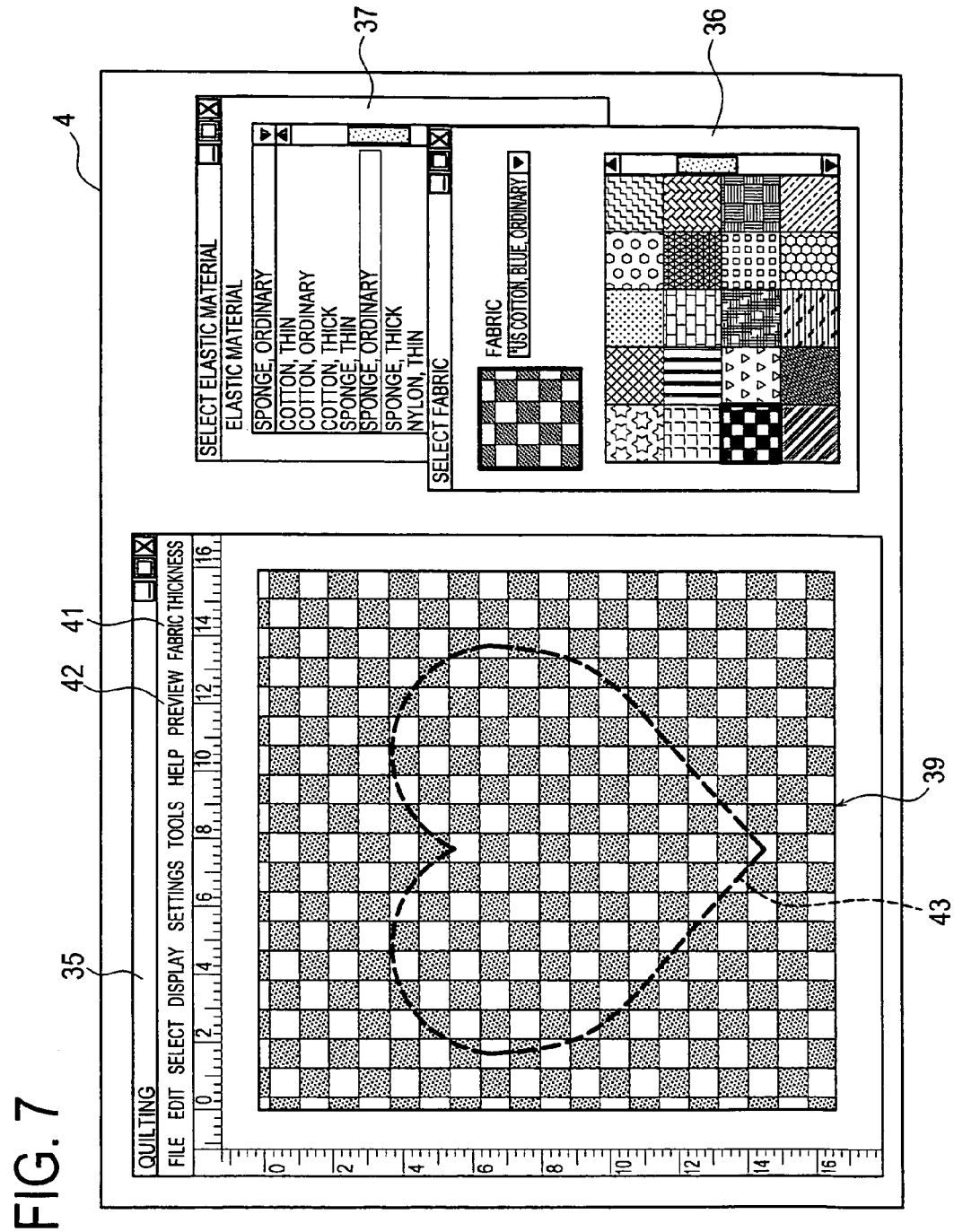
FIG. 7 is a diagram explaining the input of a sewing line.

For example, as shown in FIG. 7, when a user enters a sewing line 43 of a heart shape by a specific input from the keyboard 5 or mouse 6, the CPU 22 displays the sewing line 43 of a heart shape on the checkered fabric pattern shown in the quilting display area 39.

Figure 8:
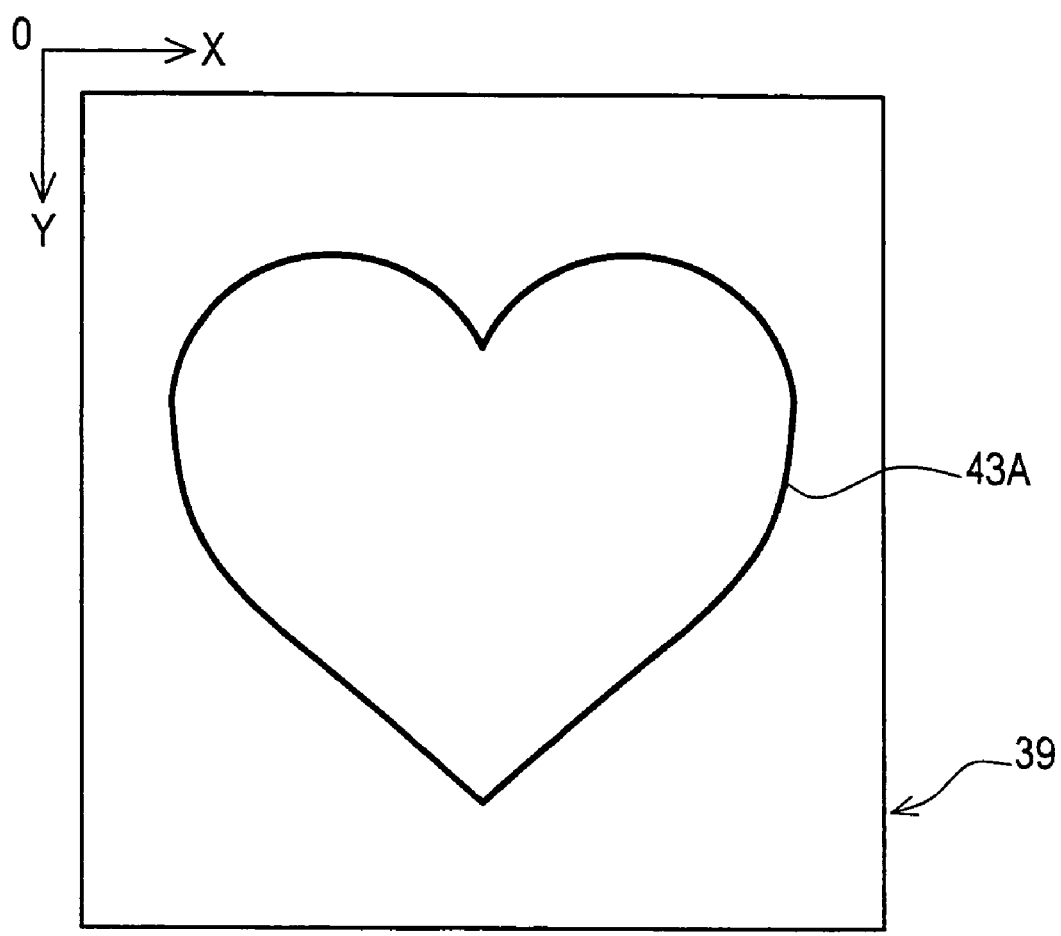
FIG. 8 is a diagram showing sewing line data entered in FIG. 7.

At the same time, as shown in FIG. 8, the CPU 22 stores in the RAM 24 the sewing line data 43A composed of position data of sewing line 43, that is in the quilting display area 39.

Next, in S3, the CPU 22 executes a judging process of judging whether or not a preview button that issues instruct was for display of a quilting pattern has been selected. When the preview button has been selected (Yes in S3), the CPU 22 proceeds to S4. On the other hand, if the preview button has not been pressed within a specified period (for example, 3 to 5 minutes) (No in S3), the CPU 22 proceeds to S8.

For example, as shown in FIG. 7, when the preview button 42 shown in the upper end part of the quilting display window 35 is clicked, by means of the mouse 6 (Yes in S3), the CPU 22 proceeds to S4. On the other hand, if the preview button 42 has not been pressed within a specified period (No in S3), the CPU 22 proceeds to S8.

In S4, the CPU 22 reads out a specified number of mesh cells from the ROM 23, divides the quilting display area into mesh of a specified number of mesh cells, creates a basic mesh pattern, and stores in the RAM 24.

Figures 9A, 9B:
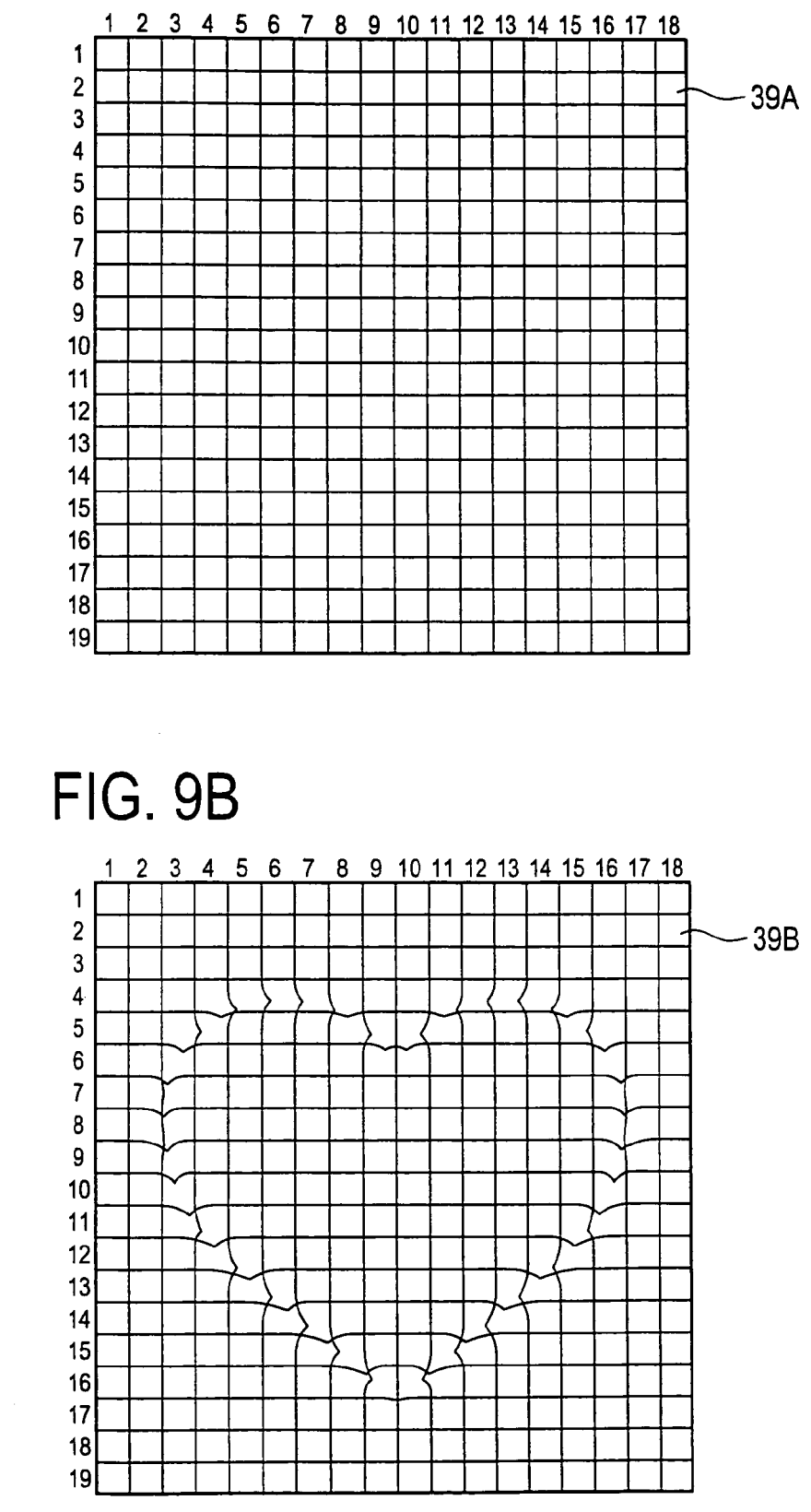

For example, as shown in FIG. 9A, the quilting display area 39 is divided into mesh of 18×19 matrix as a basic mesh pattern, and this is stored in the RAM 24 as mesh pattern 39A.

Next, in S5, the CPU 22 reads out from the RAM 24 data of fabric thickness, and reads in from the fabric deformation degree table 31 the deformation degree of mesh pattern corresponding to the fabric thickness data. The CPU 22 also reads out from the RAM 24 thickness data of the elastic material, and reads in from the elastic material deformation degree table 32 the deformation degree of a mesh pattern corresponding to the data of thickness of the elastic material. Consequently, the CPU 22 calculates the total deformation degree by adding up the deformation degrees of mesh patterns. Next, the CPU 22 reads out from the RAM 24 the sewing line data and the basic mesh data, calculates from the meshes of the basic mesh pattern each individual mesh that overlaps on the sewing line data, deforms sequentially along the sewing line at deformation degrees corresponding to the total deformation degree, creates a deformation mesh pattern by deforming, commensurately with the deformation degree, meshes adjacent to meshes that have been deformed, and stores the deformation mesh pattern in the RAM 24.

For example, as shown in FIG. 6, if the fabric thickness data stored in the RAM 24 is "ordinary," and the thickness data of elastic material is "sponge, ordinary," the CPU 22 reads out from the fabric deformation degree table 31 "2" as "deformation degree of mesh pattern", reads out from the elastic material deformation degree table 32 "5" as the "deformation degree of mesh pattern", adds up the two readings and calculates the "total deformation degree" as "7".

As shown in FIG. 9B, further, the CPU 22 reads out from the RAM 24 mesh pattern 39A (see FIG. 9A) as the basic mesh pattern, from among the meshes of mesh pattern 39A deforms sequentially along the sewing line data 43A meshes that overlap on the sewing line data 43A (see FIG. 8), by a deformation degree corresponding to total deformation degree of "7", creates mesh pattern 39B as a deformation mesh pattern and stores in the RAM 24.

In S6, the CPU 22 divides into mesh according to the basic mesh pattern, the fabric pattern displayed in a specific size in the quilting display area, creates separate fabric pattern data, deforms and adheres the separate fabric pattern data corresponding to each mesh according to the a deformation degree of each mesh that corresponds to the deformation mesh pattern stored in the RAM 24, creates deformation fabric image data, and stores in the RAM 24.

Figure 10:
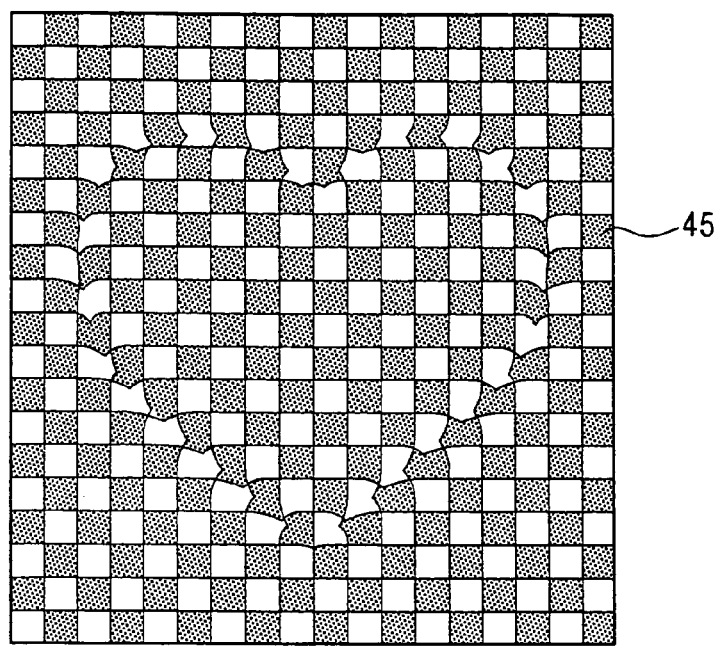
FIG. 10 is a diagram of an example of deformation fabric image data created on the basis of the deformation mesh pattern in FIG. 9B.

For example, as shown in FIG. 10, the CPU 22 divides into mesh of 18×19 matrix the checkered pattern (see FIG. 6) of the quilting display area 39 on the quilting display window 35 so as to create separate fabric pattern data, deforms and adheres the separate fabric pattern data corresponding to each mesh according to a deformation degree of each mesh that corresponds to the mesh pattern 39B, creates deformation fabric image data 45, and stores in the RAM 24.

Next, in S7, the CPU 22 reads out from the RAM 24 sewing line data and deformation fabric image data, creates quilting pattern data by overlapping the sewing line data at the upper side of the deformation fabric data, and displays as a quilting pattern that is formed by the sewing line that has been input in the quilting display area.

Figure 11:
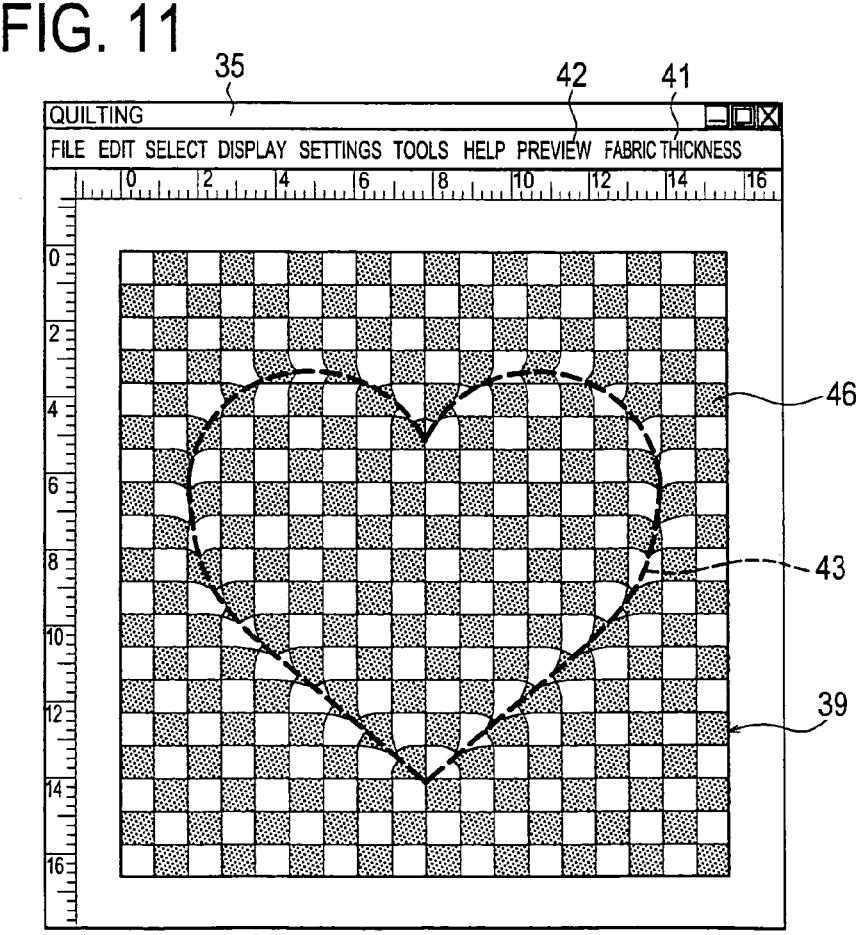
FIG. 11 is a diagram of an example of quilting pattern displayed by synthesizing the sewing line data in FIG. 8 and the deformation fabric image data in FIG. 10.

For example, as shown in FIG. 11, the CPU 22 reads out from the RAM 24 the sewing line data 43A (see FIG. 8) and the deformation fabric image data 45 (see FIG. 10), creates quilting pattern data by overlapping the sewing line data 43A at the upper side of the deformation fabric image data 45, and displays as a quilting pattern 46 formed by a sewing line 43 input in the quilting display area 39.

In S8, the CPU 22 judges whether or not an editing process of a quilting pattern is necessary. Moreover, in circumstances where an editing process of a quilting pattern has been completed (No in S8), the CPU 22 terminates this control process, and returns to the main routine.

On the other hand, when an editing process of a quilting pattern is needed (Yes in S8), the CPU 22 executes once again the processes after S1.

Figure 12:
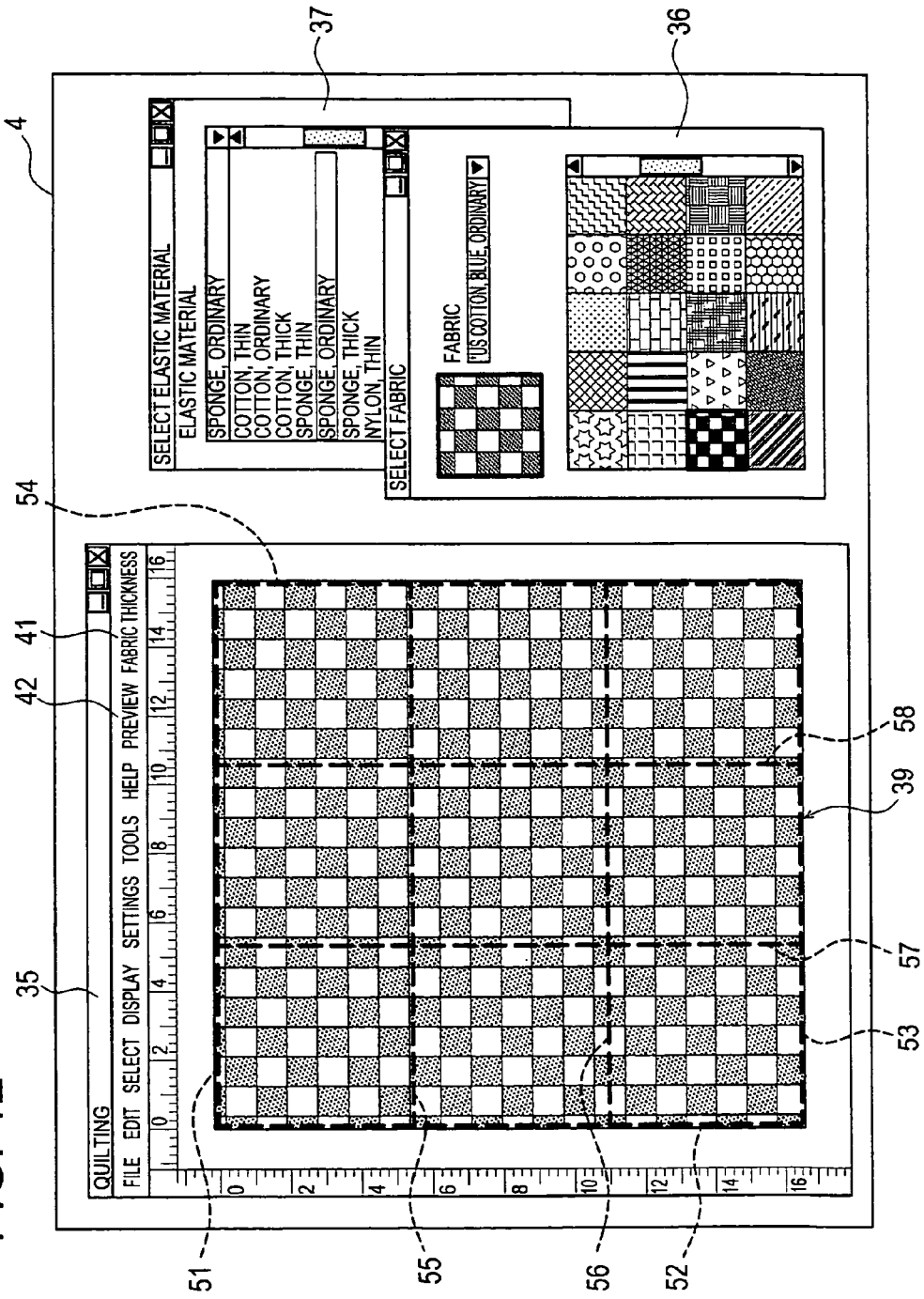
FIG. 12 is a diagram explaining another input of a sewing line.

For example, as shown in FIG. 12, if in the process of step S2, by means of a specific input from the keyboard 5 or mouse 6 a user has entered sewing lines 51 to 58 for dividing the quilting display region 39 into a matrix of 3×3, instead of the sewing line 43 of a heart shape, the CPU 22 displays sewing lines 51 to 58 on the checkered fabric pattern shown in the quilting display area 39.

Figure 13:
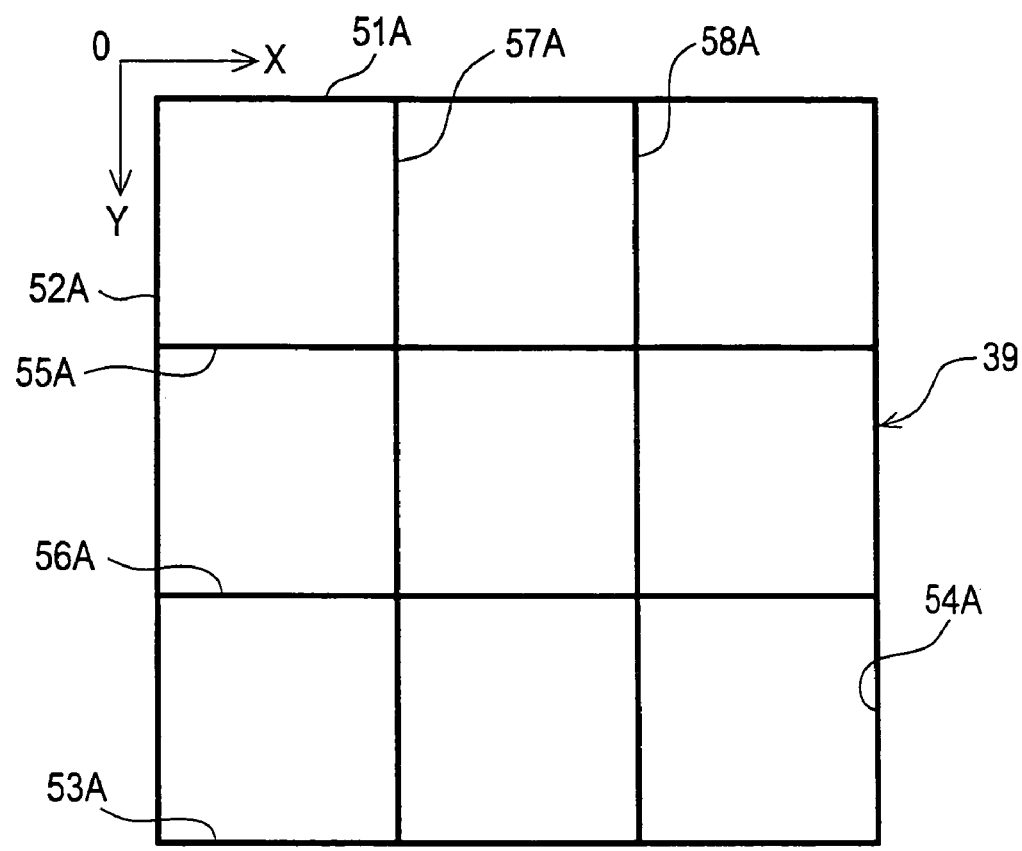
FIG. 13 is a diagram of sewing line data entered in FIG. 12.

At the same time, as shown in FIG. 13, the CPU 22 stores in the RAM 24 sewing line data 51A to 58A composed of the position data of sewing lines 51 to 58 on the quilting display area 39.

Figure 14A:
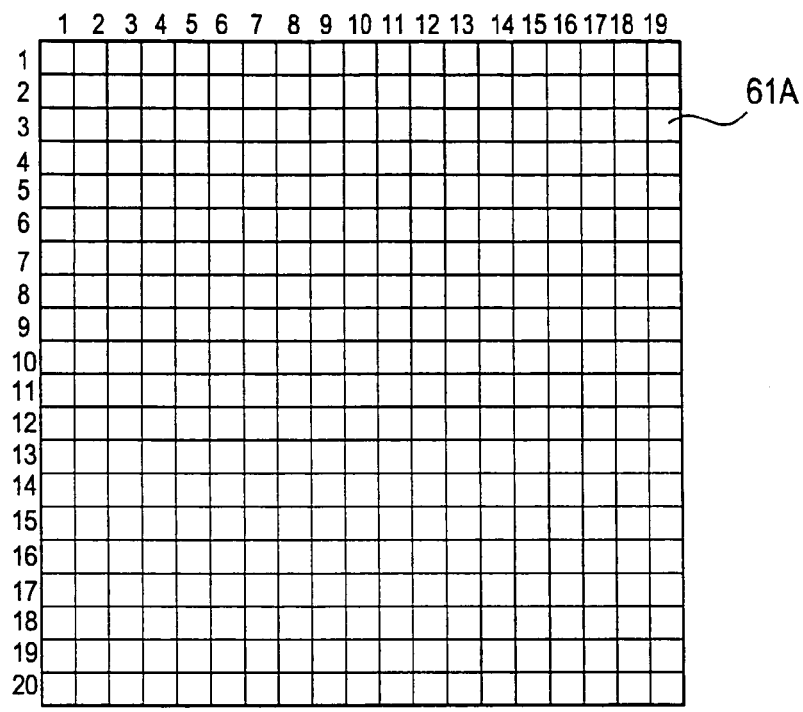
FIG. 14A is a diagram of an example of a basic mesh pattern dividing a quilting display region into mesh cells.

As shown in FIG. 14A, when the preview button 42 shown at the upper end of the quilting display window 35 is clicked by means of the mouse 6 (Yes in S3), in steps of S4 and S5 the CPU 22 creates mesh pattern 61A as a basic mesh pattern in which the quilting display area 39 is divided into 19×20 matrix mesh, and stores in the RAM 24. Further, in circumstances where the fabric thickness data stored in the RAM 24 is "ordinary," and the elastic material thickness data is "sponge, ordinary," the CPU 22 reads out from the fabric deformation degree table 31 "2" as the "deformation degree of mesh pattern", and from the elastic material deformation degree table 32 "5" as the "deformation degree of mesh pattern", adds up the two readings, and calculates the total deformation degree as "7".

Figure 14B:
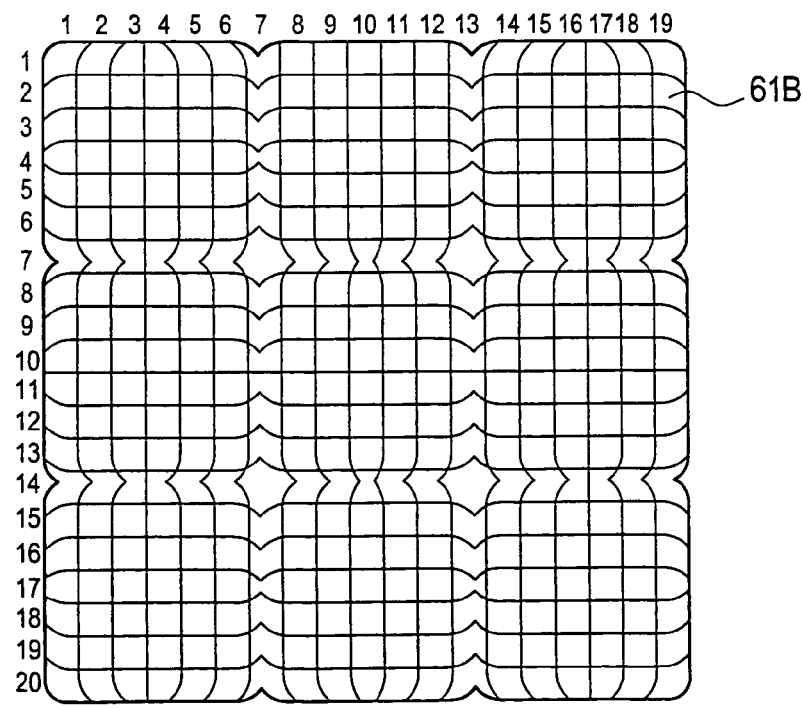
FIG. 14B is a diagram of an example of a deformation mesh pattern that is the basic mesh pattern of FIG. 14A deformed on the basis of sewing line data in FIG. 13.

Next, as shown in FIG. 14B, the CPU 22 reads out from the RAM 24 the mesh pattern 61A (see FIG. 14A) as a basic mesh pattern, and from among meshes of the mesh pattern 61A deforms meshes that overlaps on the sewing line data 51A to 58A (see FIG. 13) sequentially along the sewing line data 51A to 58A according to a deformation degree that corresponds to the total deformation degree of "7", and creates mesh pattern 61B as a deformation mesh pattern by deforming commensurately with the deformation degree meshes adjacent to the deformed meshes that have been deformed, and stores the deformation mesh pattern in the RAM 24.

Figure 15:
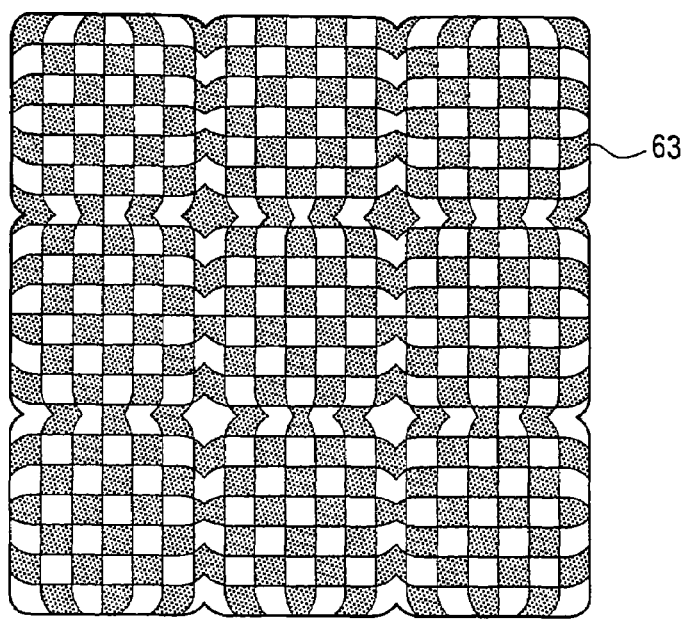
FIG. 15 is a diagram of an example of deformation fabric image data created on the basis of the deformation mesh pattern in FIG. 14B.

Next, as shown in FIG. 15, the CPU 22 creates separate fabric pattern data by dividing into meshes of 19×20 matrix the checkered pattern (see FIG. 6) shown in the quilting display area 39 of the quilting display window 35, deforms and adheres the separate fabric pattern data corresponding to each mesh according to a deformation degree of each mesh that corresponds to the mesh pattern 61B, creates deformation fabric image data 63 and stores in the RAM 24.

Figure 16:
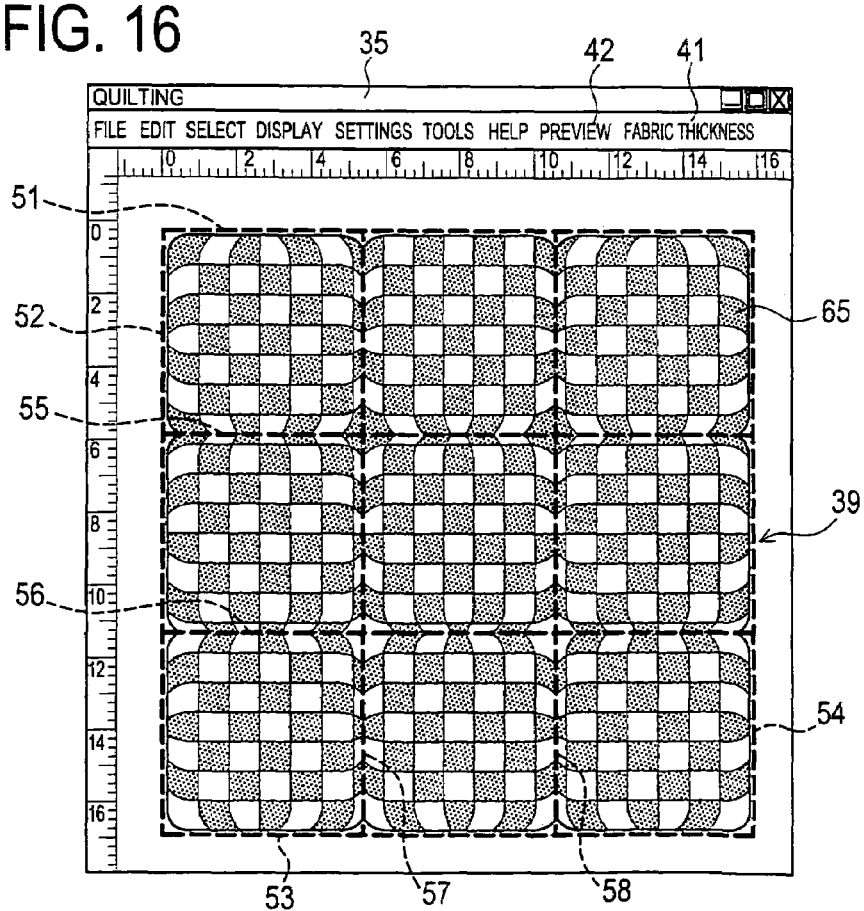
FIG. 16 is a diagram of an example of a quilting pattern displayed by synthesizing the sewing line data in FIG. 13 and the deformation fabric image data in FIG. 15.

As shown in FIG. 16, the CPU 22 consequently reads out from the RAM 24 sewing line data 51A to 58A (see FIG. 13) and deformation fabric image data 63 (see FIG. 15), creates quilting pattern data by overlapping sewing line data 51A to 58A to the upper side of the deformation fabric image data 63, and displays as a quilting pattern 65 formed by sewing line data 51 to 58 entered in the quilting display area 39.

When the editing process of the quilting pattern has been completed (No in S8), the CPU 22 terminates this control process, and returns to the main routine.

In the quilting data processing apparatus 1 of the exemplary embodiment explained above, a user selects by means of the keyboard 5 or the mouse 6, and by use of the various display screens shown on the CRT display 4, the quilting fabric pattern, the fabric thickness, and the thickness of the elastic material interposed between the upper fabric and the under fabric. The fabric pattern selected is shown in the quilting display area in a specific size, and fabric pattern data, fabric thickness data, and elastic material thickness data are stored in the RAM 24 (S1). In circumstances where a user enters a sewing line of quilting by means of a specific input from the keyboard 5 or mouse 6, the sewing line is shown in a specific size on the fabric pattern shown in the quilting display area, and the sewing line data is stored in the RAM 24 (S2). When a user selects the preview button for stipulating the display of a quilting pattern (Yes in S3), the CPU 22 divides the quilting display area into mesh of a specified number of mesh cells, creates a basic mesh pattern, adds up the deformation degree of the mesh pattern corresponding to the fabric thickness data and deformation degree of the mesh pattern corresponding to the elastic material thickness data, and calculates the total deformation degree (S4). Accordingly, the CPU 22 deforms the basic mesh pattern sequentially along the sewing line to a deformation degree that corresponds to this total deformation degree, deforms also meshes adjacent to the meshes that have been deformed commensurately with the deformation degree thereof, and creates a deformation mesh pattern (S5). Later, the CPU 22 divides the fabric pattern shown in the quilting display area in a specific size into meshes according to the basic mesh pattern, creates separate fabric pattern data, deforms and adheres the separate fabric pattern data corresponding to each mesh according to a deformation degree of each mesh that corresponds to the deformation mesh pattern, and creates deformation fabric image data (S6). Next, the CPU 22 creates quilting pattern data by overlapping the sewing line data to the upper side of the deformation fabric image data, and displays as a quilting pattern formed by the sewing line entered in the quilting display area (S7).

Consequently, when a user selects by means of the keyboard 5 or the mouse 6 the quilting fabric pattern, the fabric thickness, and the thickness of the elastic material interposed between the upper fabric and the under fabric, enters the sewing line of quilting, and selects the preview button by means of the mouse 6, the deformation fabric image data corresponding to the thickness of the fabric used in the quilting, and to the thickness of the elastic material, are created, the state of the fabric pattern changed by a sewing line can be displayed three-dimensionally, and the sewing line can be overlapped and displayed on the three-dimensional display of the fabric image. Thus, it becomes possible for the fabric pattern of an upper fabric used in quilting to be displayed in a practically finished state, modified by the sewing line. Hence, the finished state of a quilting pattern can easily be visually recognized, even by an inexperienced operator.

The disclosure may be embodied in other specific forms without departing from the essential characteristics thereof. For instance, together with the quilting data processing program, various other data, such as the fabric deformation degree table 31 and the elastic material deformation degree table 32, can be initially stored in the flexible disk 7A. During step 5, the CPU 22 can read in from the fabric deformation degree table 31 stored in the flexible disk 7A the deformation degree of the mesh pattern corresponding to the data of fabric thickness, and from the elastic material deformation degree table 32 stored in the same flexible disk 7A the CPU 22 can also read in the deformation degree of a mesh pattern corresponding to the data of the elastic material thickness. Further, the CPU 22 may be also designed so as to calculate the total deformation degree by adding up the deformation degrees of the mesh patterns.

While the presently exemplary embodiment of the disclosure has been shown and described, it is to be understood that this disclosure is for the purpose of illustration and that various changes and modifications may be made without departing from the scope of the disclosure as set forth in the appended claims.

What is claimed is:

1. A quilting data processing apparatus comprising:
    a fabric image data input device that enters fabric image data relating to a fabric pattern used in quilting;
    a sewing line data input device that enters sewing line data of a quilting pattern;
    a mesh pattern setting device that sets a basic mesh pattern of a desired mesh shape;
    a deformation mesh pattern creating device that creates a deformation mesh pattern by deforming the basic mesh pattern on the basis of the sewing line data;
    a deformation fabric image data creating device that creates deformation fabric image data modifying the fabric image data on the basis of the deformation mesh pattern; and
    a quilting pattern display device that displays the quilting pattern on the basis of the deformation fabric image data and the sewing line data.

2. The quilting data processing apparatus according to claim 1, further comprising:
    a quilting condition input device that enters a quilting setting condition; and
    a deformation degree setting device that sets a deformation degree of the basic mesh pattern on the basis of the setting condition entered by the quilting condition input device,
    wherein the deformation mesh pattern creating device changes the deformation degree of the basic mesh pattern commensurately with the deformation degree determined by the deformation degree setting device.

3. The quilting data processing apparatus according to claim 2,
    wherein the deformation degree setting device includes:
    a deformation degree storage device that stores in advance the deformation degree of the basic mesh pattern that corresponds to the quilting setting condition; and
    a deformation degree selecting device that selects the deformation degree of the basic mesh pattern that corresponds to the setting condition entered by the quilting condition input device, from among the deformation degrees of the basic mesh patterns stored in the deformation degree storage device, and
    the deformation degree setting device sets the deformation degree selected by the deformation degree selecting device as the deformation degree of the basic mesh pattern.

4. The quilting data processing apparatus according to claim 2,
    wherein, when plurality of the setting conditions are entered through the quilting condition input device, the deformation degree setting device sets the deformation degrees of the basic mesh patterns each of which corresponds to the setting conditions, and further determines the deformation degree of the basic mesh pattern according to the set deformation degrees.

5. The quilting data processing apparatus according to claim 2,
    wherein the quilting condition input device has a fabric thickness setting device that sets a thickness of a fabric used in quilting, and
    the deformation degree setting device sets the deformation degree of the basic mesh pattern that is commensurate with the thickness of the fabric determined by the fabric thickness setting device.

6. The quilting data processing apparatus according to claim 2,
    wherein the quilting condition input device has an elastic material thickness setting device that sets a thickness of an elastic material interposed between an upper fabric and an under fabric of the quilting, and
    the deformation degree setting device sets the deformation degree of the basic mesh pattern that is commensurate with the thickness of the elastic material determined by the elastic material thickness setting device.

7. The quilting data processing apparatus according to claim 1, further comprising:
    a first display data creating device that creates first display data for displaying a deformed fabric image on the basis of the deformation fabric image data created by the deformation fabric image data creating device; and
    a second display data creating device that creates second display data for displaying a sewing line on the basis of the sewing line data,
    wherein the quilting pattern display device displays an image by synthesizing the first display data and the second display data.

8. A computer program product used and executed by a quilting data processing apparatus comprising:
a computer readable recording medium; and
a computer program stored in the computer readable recording medium,
wherein the computer program includes:
a fabric image data input step of entering fabric image data relating to a fabric pattern used in quilting;
a sewing line data input step of entering sewing line data of a quilting pattern;
a mesh pattern setting step of setting a basic mesh pattern of a desired mesh shape;
a deformation mesh pattern creating step of creating a deformation mesh pattern by deforming the basic mesh pattern on the basis of the sewing line data;
a deformation fabric image data creating step of creating deformation fabric image data by modifying the fabric image data on the basis of the deformation mesh pattern; and
a quilting pattern display step of displaying the quilting pattern on the basis of the deformation fabric image data and the sewing line data.

9. The computer program product according to claim 8, wherein the computer program further includes:
a quilting condition input step of entering a quilting setting condition; and
a deformation degree setting step of setting a deformation degree of the basic mesh pattern on the basis of the setting condition entered at the quilting condition input step,
wherein the deformation mesh pattern creating step changes the deformation degree of the basic mesh pattern commensurately with the deformation degree determined at the deformation degree setting step.

10. The computer program product according to claim 9, wherein the computer program further includes:
a database that stores in advance the deformation degree of the basic mesh pattern that corresponds to the quilting setting condition,
the deformation degree setting step includes:
a deformation degree selecting step of selecting the deformation degree of the basic mesh pattern that corresponds to the setting condition entered at the quilting condition input step, from among the deformation degrees of the basic mesh patterns corresponding to the setting condition stored in the database; and
the deformation degree setting step determines the deformation degree selected at the deformation degree selecting step as the deformation degree of the basic mesh pattern.

11. The computer program product according to claim 9, wherein, when plurality of the setting conditions are entered at the quilting condition input step, the deformation degree setting step sets the deformation degrees of the basic mesh patterns each of which corresponds to the setting conditions, and further determines the deformation degree of the basic mesh pattern according to the set deformation degree.

12. The computer program product according to claim 9, wherein the quilting condition input step has a fabric thickness setting step of setting a thickness of a fabric used in quilting, and
the deformation degree setting step sets the deformation degree of the basic mesh pattern that is commensurate with the thickness of the fabric determined at the fabric thickness setting step.

13. The computer program product according to claim 9, wherein the quilting condition input step has an elastic material thickness setting step of setting a thickness of an elastic material interposed between an upper fabric and an under fabric of the quilting, and
the deformation degree setting step sets the deformation degree of the basic mesh pattern that is commensurate with the thickness of the elastic material determined at the elastic material thickness setting step.

14. The computer program product according to claim 8, wherein the computer program further includes:
a first display data creating step of creating first display data for displaying a deformed fabric image on the basis of the deformation fabric image data created at the deformation fabric image data creating step; and
a second display data creating step of creating second display data for displaying a sewing line on the basis of the sewing line data,
wherein the quilting pattern display step displays an image by synthesizing the first display data and the second display data.

* * * * *